United States Patent Office 3,756,936
Patented Sept. 4, 1973

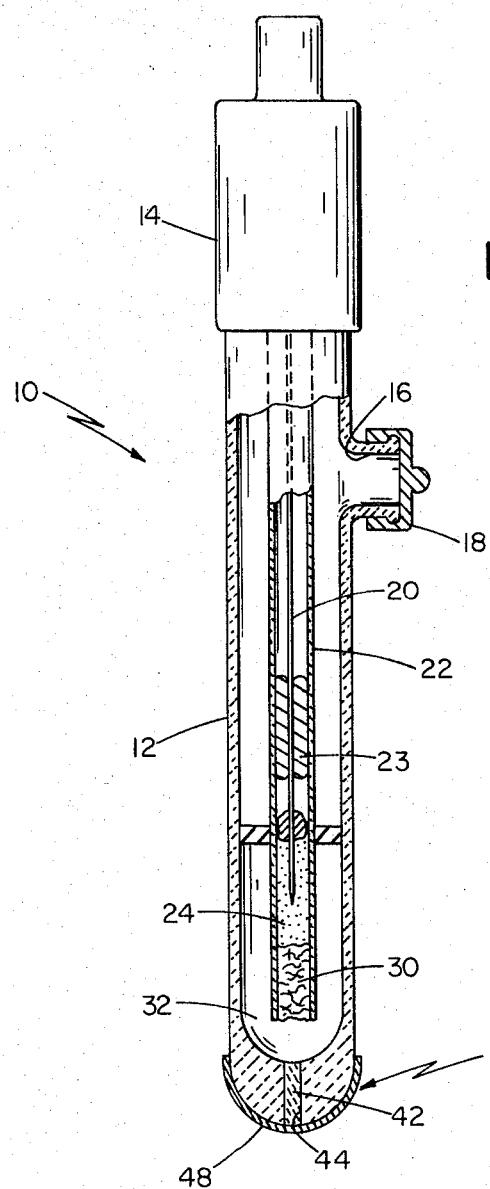
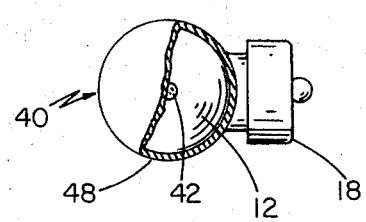

3,756,936
ELECTROCHEMICAL ELECTRODE STRUCTURE
Robert N. Neuwelt, Arlington, Mass., assignor to Instrumentation Laboratory, Inc., Lexington, Mass.
Filed Sept. 28, 1970, Ser. No. 76,097
Int. Cl. G01n 27/30
U.S. Cl. 204—195 F                5 Claims

ABSTRACT OF THE DISCLOSURE

Sealing leak structures of electrochemical electrodes with a continuous organic film applied to the external face of the leak structure, the film being inert to electrolyte in the electrode, essentially insoluble in that electrolyte at ambient electrode condition, and water-soluble at a temperature above ambient.

SUMMARY OF INVENTION

This invention relates to electrochemical electrode structures and more particularly to leak structures for providing a liquid junction in an electrochemical electrode such as is used as a reference for ion potential measurements.

In electrochemical measurements two electrodes, a measuring electrode and a reference electrode, are commonly employed in an arrangement whereby the potential difference between the two electrodes is a function of the concentration of a specific ion in the solution of interest. Such an electrochemical electrode structure is used for measuring hydrogen ion concentration, for example. The reference electrode is ordinarily disposed in an electrolyte solution and the measuring electorde is disposed in the sample to be measured. An electrical connection is provided between the electrolyte and the same by permitting a small flow of electrolyte into the sample through a leak structure to form a "liquid junction."

Leak structures are comomnly made by disposing a porous member in an aperture in the reference electrode, the porous member being formed, e.g., of wicking, asbestos fibers, sintered glass, or ceramic. Other forms of leak structures include tiny cracks in the glass wall of the electrode, small capillary tubes, or annular spaces about metal rods molded in openings in the glass walls of the electrode. Such leak structures are designed to provide a certain slow passage of liquid therethrough.

A reference electrode typically comprises a metal in contact with a sparingly soluble salt of the metal in the electrolyte, the metal salt having a non-metallic ion in common with the electrolyte. Since the metal-metal salt must be equilibrated with the electrolyte before the reference electrode is useable, and further since, e.g., for calomel-KCl reference electrodes, this equilibration may take several days, it is desirable to maintain the electrode filled with electrolyte. Therefore, the leak structure must be sealed if one is to avoid constant refilling of the electrode for storage of the electrode in an electrolyte medium. Particularly, such a seal is advantageous if it is desired to store or ship equilibrated electrodes. Rubber or plastic plugs have been proposed for this purpose, but these have the disadvantages that they are difficult to attach, increase the risk of breaking the electrode, often tend to stick to the glass, and are not sufficiently leak-proof.

It is an object of this invention to provide novel and improved seals for leak structures which are reliable, economical, easy to apply, readily removable, and non-interfering with the electrochemical properties of the electrode.

Another object is to provide a method for removably sealing leak junctions during periods of non-use of the electrode.

A further object is to provide ready-to-use equilibrated electrochemical electrodes in an easily shippable form.

The invention features an electrochemical electrode having structure defining an electrolyte-containing chamber and a leak structure for leaking electrolyte at a controlled rate out of the chamber with an electrolyte-impermeable seal affixed to the external face of the leak structure comprising a film of organic material that is inert to electrolyte, substantially insoluble in electrolyte at ambient electrode conditions, and water-soluble at a temperature above ambient. Preferably, the solubility of the organic material in water is less than about 100 g./l. at 24° C., and at least about 200 g./l. at 60° C. The organic material also should have a large molecular size, so as to be incapable of migrating upstream through the leak structure in substantial amounts which would affect the electrolyte. A preferred organic material is dextran having a (number average) molecular weight of about 30,000 to 50,000.

In another aspect, the invention features a method for sealing the leak structure of an electrochemical electrode containing an electrolyte leakably confined within the electrode by a leak structure comprising immersing the external face of the leak structure in a liquid medium containing an organic material which is inert to the electrolyte to form a liquid film on the face surfaces, and removing the electrode from the medium to form a thin, continuous, film that is electrolyte-impervious at ambient electrode conditions and removable from the face surfaces at a temperature above ambient. In a preferred embodiment, the liquid medium is a saturated aqueous solution of dextran having a molecular weight of about 30,000 to about 50,000 and the continuous film is removed by contact with water at a temperature above ambient such as obtained from a hot water faucet.

Other objects, features, and advantages will be apparent from the following description of a preferred embodiment of the present invention, taken together with the attached drawings thereof, in which:

FIG. 1 is a partially sectional schematic view of a conventional reference electrode having a leak structure seal in accordance with the invention; and FIG. 2 is an end view partially broken away, of the electrode of FIG. 1.

DESCRIPTION OF PARTICULAR EMBODIMENT

The figures show a reference electrode 10 including a tubular glass member 12 sealed at the top by an appropriate plug 14 and having an aperture 16, for filling member 12, blacked by stopper 18. A silver wire 20 extends through the half cell structure 22 of electrode 12, through a support 23, into a calomel mass 24. A porous plug 30 is inserted in the open end of half cell structure 22 to establish fluid communication therethrough with electrolyte (potassium chloride) 32 in tube 12. Leak structure 40 is provided by a conventional porous ceramic plug 42 sealed in aperture 44 of member 12.

A thin organic film 48 is adhered to the external face of plug 42, and to adjacent surfaces of member 12. Film 48 is effectively inert to the potassium chloride electrolyte and insoluble therein at ambient electrode conditions (e.g., those encountered during shipping or storage conditions, typically below about 40° C., and atmospheric pressure), and is water-soluble at an elevated temperature above ambient. A preferred film consists of dextran having a molecular weight of about 30,000 to 50,000 (preferably, about 40,000).

The preferred film 48 is applied by forming a saturated aqueous dextran solution (300 mg. of dextran per ml. of water) at 45–50° C., and immersing the face of plug 42 and adjacent surface portions of the electrode in the solution for a few seconds. The electrode is then removed from the solution, and the water allowed to evaporate, leaving a film which is thin, continuous, electrolyte-impervious at ambient conditions, and water-soluble at an elevated temperature.

Dextran of molecular weight 40,000 has a solubility in saturated KCl solution, at 40° C., and atmospheric pressure, of about 10 g./l., so that, even if the electrode is raised to temperatures of 40° C., the dextran film, which will be in contact with electrolyte at the film-leak structure interface, will not be dissolved by the electrolyte. Since the dextran solubility, even at these temperatures, is nonetheless finite, however, there may be some dextran dissolved in electrolyte at the interface. But large organic molecules, such as dextran of molecular weight of about 40,000, will not easily migrate up through a porous leak structure, which in a typical calomel electrode allows a leak rate of one cc. or less per day, and has pore sizes in the range of about 0.1–0.5 microns. The solubility of the dextran in the adjacent electrolyte rapidly reaches saturation, prior to any substantial lessening of the thickness of the adhering film, and deters further movement of the dextran molecules from the interface region.

Moreover, since the solubility of this dextran in water increases about 500 g./l. at only 60° C., a temperature available from a running faucet, the film may be readily dissolved and washed away when the electrode is to be used. Water solubility avoids the necessity for exposing the leak structure to organic solvents which might adversely affect the electrolyte within the electrodes.

After the film has dried, on the electrode, it may be filled with electrolyte and allowed to equilibrate. The electrode may then be shipped, stored, or otherwise maintained in a non-use condition, without electrolyte leakage, and will remain in an equilibrated solution until it is ready to use. The film is readily removable in hot water, without the necessity for one to touch the fragile electrode portions at the leak structure.

In addition to the illustrated reference electrode, the leak structures of a variety of other electrodes, including combination electrodes may be similarly sealed.

Other embodiments will occur to those skilled in the art and are within the following claims.

What is claimed is:

1. In an electrochemical electrode having structure defining an electrolyte-containing chamber, an electrolyte in said chamber, and a leak structure for leaking electrolyte at a controlled rate out of said chamber, the improvement wherein an electrolyte impervious seal is affixed to the external face of said leak structure, which seal comprises a continuous organic film which is inert to said electrolyte, and water-soluble at a temperature above 50° C.

2. An electrode according to claim 1 wherein said organic film consists of a dextran that is soluble in water at a temperature above 50° C.

3. An electrode according to claim 2 wherein said dextran has a molecular weight of about 40,000.

4. An electrode according to claim 1 wherein said organic film is formed of organic material having a solubility in water of less than about 100 g./l. at 24° C., and at least about 200 g./l. at 60° C.

5. In an electrochemical electrode having structure defining an electrolyte containing chamber and a leak structure for leaking electrolyte at a controlled rate out of said chamber, the improvement wherein an electrolyte impervious seal is affixed to the external face of said leak structure, said seal comprising a continuous film of a dextran that is soluble in water at a temperature above 50° C., said dextran having a molecular weight in the range of about 30,000 to about 50,000.

References Cited
UNITED STATES PATENTS

| | | | |
|---|---|---|---|
| 3,066,996 | 12/1962 | Hiler | 117—165 X |
| 3,290,584 | 12/1966 | Harms et al. | 324—30 R |
| 2,864,707 | 12/1958 | Toulmin | 117—165 X |
| 2,925,370 | 2/1960 | Rohrer | 204—195 F |

GERALD L. KAPLAN, Primary Examiner

U.S. Cl. X.R.

117—6, 165